March 30, 1954
R. J. MILLER ET AL
2,673,506
IMPLEMENT HITCH
Filed Sept. 27, 1951
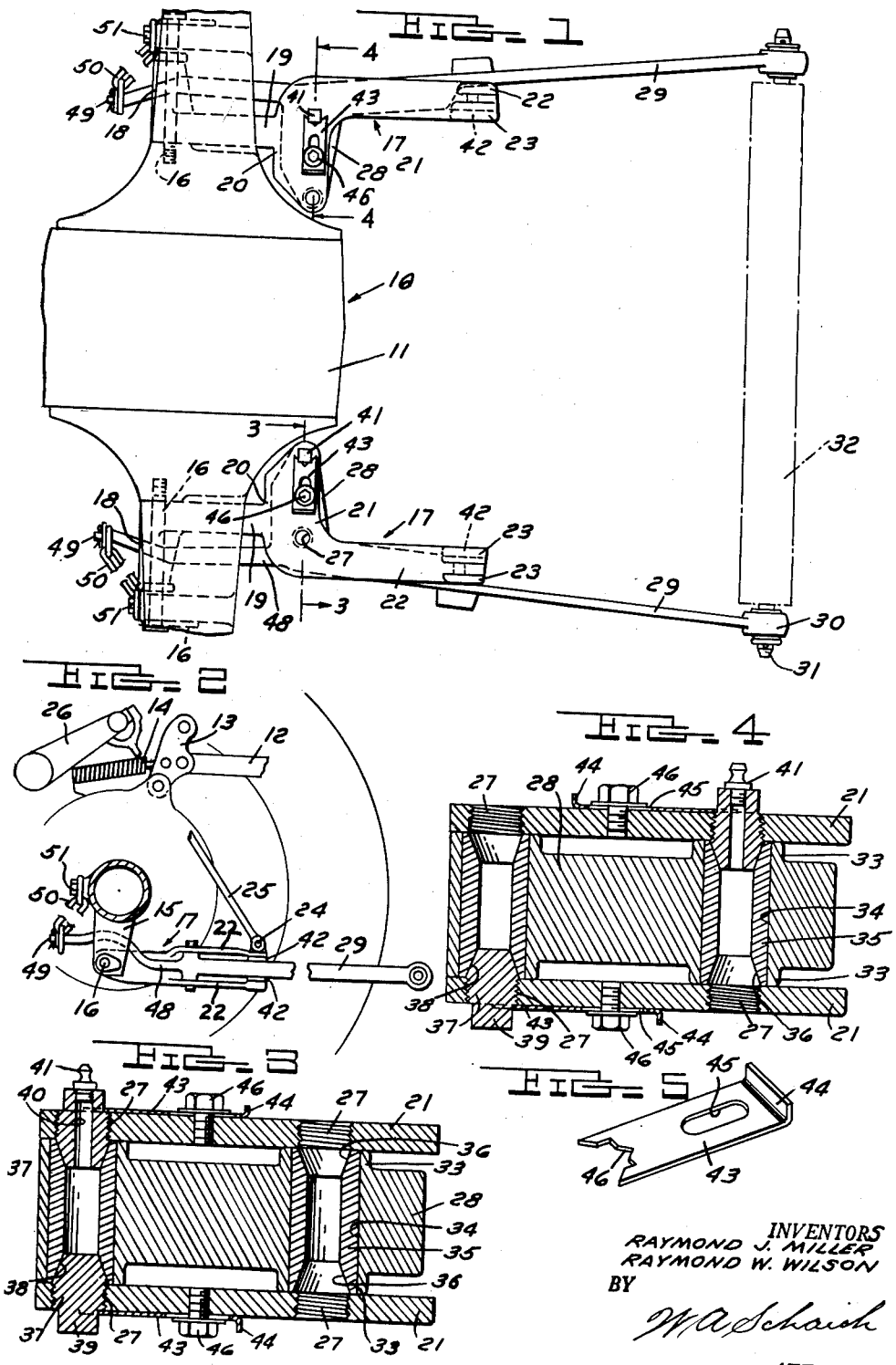
INVENTORS
RAYMOND J. MILLER
RAYMOND W. WILSON
BY
W. A. Schaich
ATTORNEY Patented Mar. 30, 1954

2,673,506

UNITED STATES PATENT OFFICE 2,673,506

IMPLEMENT HITCH

Raymond J. Miller, Detroit, and Raymond W. Wilson, Ferndale, Mich., assignors to Dearborn Motors Corporation, Birmingham, Mich., a corporation of Delaware Application September 27, 1951, Serial No. 248,544

8 Claims. (Cl. 97—46.07)

The present invention relates to an implement hitch for a tractor and more particularly to a hitch including longitudinally aligned power-liftable hitch link elements pivotally connected to one another for relative lateral movement about selected substantially vertically disposed bearing axes.

The hitch of the present invention is of the same general type as that disclosed in the pending application of Ralph C. Frevik and Frederick D. Sawyer, Serial No. 234,597, filed June 30, 1951, assigned to the assignee of this invention.

The above identified pending application discloses an implement hitch including a pair of laterally spaced forwardly converging hitch links mounted on the tractor in a trailing relation and adapted to connect an implement thereto. Each link is composed of a pair of longitudinally aligned link elements, the forward one of which is pivoted to the tractor for movement in a vertical plane only. The link elements themselves are pivoted to one another for movement in a lateral plane about vertical axes, and means are provided for laterally shifting the location of the vertical pivot axis so that the point of theoretical convergence of the hitch links may be shifted longitudinally of the tractor.

The present invention provides an improved linkage of this same general variable-convergence type having an improved anti-friction bearing structure forming the vertical pivot point. The bearing structure generally includes a bushing carried by one of the hitch links and having oppositely directed interior bearing surfaces against which a second bearing member carried by the other link element is seated. The cooperable bearing surfaces are adjustable relative to one another to compensate for wear during use, and the link elements may be stabilized against relative pivoting movement by mere adjustment of the bearing means. Under ordinary operating conditions, the link elements contact one another only in the immediate area of the bearing means. However, under extreme operating conditions, one of the elements may be deflected into contact with the other of the elements so as to be additionally supported thereby.

In addition, the present invention provides a novel means for limiting the extent of relative lateral movement of the link elements which is particularly adapted to the anti-friction bearing structure. Heretofore, considerable difficulty has been encountered in three-point linkages when the lower link check chains are taut and the implement is held in a position above that of the tractor rear wheels, inasmuch as the tautness of the check chains prevents lateral spreading of the links to remove the implement from the linkage. In the event of such an occurrence when utilizing the present invention, it is possible to disassemble the bearing and freely move one of the linkage elements.

It is, therefore, an important object of the present invention to provide an improved implement hitch including longitudinally aligned hitch link elements secured together for relative pivoting movement about an anti-friction bearing.

Another important object is the provision of an implement linkage wherein relative pivoting movement of a pair of longitudinally aligned link elements in a lateral plane is facilitated by antifriction surfaces formed on the two elements and wherein deflection of one of the elements under heavy load results in additional support of the one element by the other element.

It is a further important object to provide an improved implement hitch including longitudinally aligned relatively pivotable link elements secured together for relative lateral movement by selectively shiftable bearing elements which are also adjustable to compensate for bearing wear during use.

Still another object of the present invention is the provision of an implement hitch having longitudinally aligned hitch link elements pivotable about vertically disposed axes and having means for limiting the relative lateral movement thereof, the vertical axis being defined by bearing means which are removable to accommodate free relative lateral movement of the elements to prevent undesirable locking of the same under certain positions of a connected implement relative to the tractor.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention.

On the drawings:

Figure 1 is a somewhat schematic plan view of the portion of a tractor provided with an implement hitch of the present invention;

Figure 2 is a side elevational view of the tractor and hitch of Figure 1, with the left tractor wheel being removed for clarity of illustration;

Figure 3 is a sectional view, with parts shown in elevation, taken along the plane 3—3 of Figure 1;

Figure 4 is a sectional view similar to Figure 3 taken along the plane 4—4 of Figure 1; and Figure 5 is a perspective view of a retaining clip utilized with a hitch of the present invention.

As shown on the drawings:

In Figures 1 and 2, reference numeral 10 refers generally to a tractor, such as a Ford tractor, having a rear axle housing 11 upon which are disposed the link elements of a three-point implement hitch linkage. The hitch linkage includes a top link 12 pivoted to a reaction arm 13 mounted on the rear axle housing in the conventional manner for reaction against the control spring 14 of an hydraulic depth control apparatus, as is well-known in the art.

Beneath the rear axle housing 11 and on either side of the center portion thereof, there are provided depending bracket arms 15 adapted to receive therethrough an elongated, generally horizontal pivot pin 16 which is threadably retained by the axle housing 11 at its inner end. Upon each of the pins 16, there is disposed a forward hitch link element 17. Each link element 17 includes a forward laterally extending boss 18 through which the pin 16 projects and an intermediate rearwardly extending arm portion 19 joining the boss 18 to a laterally projecting link portion 20 which is composed of vertically spaced plates 21, each having a terminal rearwardly extending arm 22. The upper of the rearward arms 22 carries a pair of upstanding, laterally spaced ears 23 adapted to receive a pivot pin 24 therethrough. The pin 24 serves to secure a lift arm 25 to each of the link elements 17, and the arms 25 are secured at their upper ends to rock arms 26 which are energizable from the tractor hydraulic mechanism for elevating the elements 17. Thus, it will be seen that the link elements 17 are disposed for pivoting movement solely in a substantially vertical plane about the laterally extending pivot pins 16.

As best seen in Figures 3 and 4, the forward laterally extending portions of arms 21 of the elements 17 are provided with laterally aligned, vertically registering, interiorly threaded apertures 27. The arms 21 of each of the elements 17 are adapted to receive therebetween a forward laterally extending crank arm 28 formed at the forward terminal end of rearward hitch link elements 29. The rearwardly extending arms of the elements 29 are provided at their rear ends with segmental spherical universal joints 30 for attachment to pivot pins 31 projecting beyond the A-frame or drawbar of an implement 32 and the top link 12 is also adapted for attachment to the implement 32 above and intermediate the link elements 29.

The crank arm portions 28 of the arms 29 are provided with vertically aligned upstanding and depending embossments 33 which are vertically apertured, as at 34, to receive therethrough interior generally cylindrical bushings 35 vertically alignable with the apertures 27 of the arms 21. The vertically extending bushings 35 are provided at their axial ends with frusto-conical interior bearing surfaces 36 of substantially the same major diameter as the threaded apertures 27. The apertures 27 are adapted to receive bearing nuts 37 having exteriorly threaded intermediate portions mating with the threads of the apertures and having interior frusto-conical peripheral bearing surfaces 38 matingly engaging the surfaces 36 of the bushings 35. The outermost portions of the nuts are provided with polygonal heads 39 adapted to receive a wrench or the like.

It will be seen from Figures 3 and 4 that a pair of nuts 37 are provided for each crank arm 28, and one of the pair of nuts is provided with an axial bore 40 for communication with a grease fitting 41 carried thereon. The pair of nuts 37, when positioned as shown in Figure 3, cooperate with the bushing 35 interposed therebetween to define a vertical axis about which the arm 29 is pivotable. Actual pivoting movement occurs along the frusto-conical surfaces 36 and 38, and bearing wear during use will take place on the same surfaces. However, it is to be noted that the vertical dimension of the link element 29 is less than the vertical distance between the rear portions 22 of the arms 21 so that under normal operating conditions the arm 29 is spaced, as at 42, from the corresponding portion of the forward link element 17. If the load upon the arm 29, i. e., the weight of the implement 32 or the reactance force of the implement 32 against the soil, exceeds a predetermined limit, the rear end of the arm 29 will be deflected downwardly sufficiently to engage the lower one of the arms 22. Due to this deflection of the arm 29, the arm is additionally supported by the forward link element 17 at that time when such support is necessary. Actually, the illustrated embodiment of the present invention is designed and constructed so that a force of 1,000 pounds on each element 29 at the rear end thereof, or a total force of 2,000 pounds will be sufficient to deflect the rear elements into contact with the forward elements. This force is well in excess of the normal implement load, but such force may be exceeded under extreme operating conditions.

In order to prevent the loosening of the bearing nuts 37 by back threading of the same within the apertures 27, retaining clips 43 are provided. As best seen in Figure 5, these clips are generally rectangular in contour and are provided with a terminal upstanding flange 44. Adjacent the flange 44, the clips are slotted, as at 45, for the reception of cap screws 46 threadably retained by the arms 27. The terminal end of the clips 43 remote from the flange 44 are notched, as at 46, to receive the polygonal corners of the nut heads 39. It will be seen that the clips may be moved laterally so that the notches 46 receive the nut head corners by merely sliding the clip beneath the loosening screw 46, and tightening of the screw 46 will retain the clip in a laterally adjusted position in engagement with the nut head 39. It will be noted that the clip notches 46 are designed to accurately register with the bearing nut rectangular heads at each ⅛ turn of the head, thus accommodating accurate compensation for bearing wear.

In order to limit lateral swinging movement of the rear link elements 29 and to center the implement 32 when the same is fully elevated, the crank arm portions 28 of the arms 29 are provided with forwardly projecting check arms 48 which extend forwardly and upwardly over and beyond the forward element pin housings 18. The check arms terminate in a pin 49 receiving a check chain 50 thereabout. The chains 50 are secured, as by nuts 51, to the forward central portion of the rear axle housing in laterally spaced relation to the arm when the same is in its normal position (Figure 1). Since a check chain and check arm is provided for each of the laterally spaced rear arms 29, it will be appreciated that the swinging movement of a connected implement or drawbar is limited in each direction, and the chains 50 are so dimensioned that they are taut when the linkage is elevated to its uppermost or transport position.

As has been previously explained, in conventional universally pivoted linkages, difficulty is experienced in disconnecting the implement 32 from the links when the check chains are taut and it is necessary to spread the links to disconnect the implement therefrom. Such a condition may occur where the tractor rear wheels drop into a depression and the implement is higher than the rear wheels, causing the chains to be tightened to their full length. In such case the tractor wheels do not develop sufficient traction to pull out of the depression and towing is the only solution. Under the same circumstances with the instant invention, it is only necessary to remove the bearing nuts 37 after which the rear elements 29 may be laterally moved outwardly, inasmuch as the chain need not be further lengthened, and the link pivot end 30 may be readily removed from the implement pivot pin 31.

Another advantage of the present invention is illustrated in Figure 4 wherein it will be seen that the upper pivot nut 37 and the lower pivot nut 37 are in engagement with different bushings carried by the crank arm 28. When this condition exists, the crank arm is retained against lateral swinging movement and is laterally rigidified in a single position, since pivoting movement of the arm is prevented by the provision of a pair of laterally spaced attachment points. Thus, the linkage is laterally stabilized without interfering with freedom of vertical movement and without the utilization of any additional, extraneous locking members.

From the foregoing description, it will be appreciated that the present invention provides a new and novel implement-tractor linkage wherein the hitch link elements are pivoted relative to one another for lateral movement about a selected vertical axis, so that the links may effectively converge at spaced points along the longitudinal tractor draft line. Further, bearing means are provided for insuring freedom of lateral movement without frictional binding, while at the same time providing additional support for the laterally movable hitch link elements under extreme operating conditions. Also, the bearing structure is such that wear of the bearing surfaces is taken up by simple threaded adjustment of the bearing members during use. Clip means are provided for preventing unwarranted movement of the bearing element, and a novel arrangement for limiting lateral movement without the possibility of locking is provided.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In an implement hitch for a tractor, a pair of trailing laterally spaced hitch links each of which comprises a forward link element attachable at its forward end to said tractor for vertical swinging movement and having a rearwardly extending free end provided with laterally spaced apertures, a rear link element having a laterally projecting crank arm portion overlapping the free end of said forward element, a pair of laterally spaced vertically extending bearing bushings carried by said crank arm portion, a pivot element carried by the free end of said forward element for extension through a selected one of said apertures into engagement with an aligned one of said bushings for pivotally attaching said crank arm portion thereto for horizontal relative pivoting movement about a selected pivot axis determined by the lateral location of the aperture through which said pivot element extends, and means at the other end of said rear element for securing the same to a tractor.

2. In an implement hitch for a tractor having a rear axle housing, a pair of trailing laterally spaced hitch links each of which comprises a forward link element attachable to the tractor in vertical alignment with the tractor rear axle housing for free vertical movement and having a rearwardly extending free end, a rear link element pivotally attached to the rear end of said forward element for horizontal swinging movement about an axis rearwardly of and spaced from said tractor, bearing means defining said axis and pivotally securing said elements to one another, an arm on said rear element projecting forwardly from said vertical axis to underlie said tractor rear axle housing ahead of said forward link element, and flexible check means joining said arm to said rear axle housing in advance of said horizontal axis to limit lateral swinging movement of said rear element.

3. In an implement hitch for a tractor, a pair of laterally spaced hitch links each including a pair of longitudinally aligned front and rear hitch link elements adapted for attachment to the tractor and an implement respectively and having overlapping intermediate portions, an open-ended bushing carried by one of the elements of each of said links, threaded bearing members carried by the others of said elements for insertion into the open ends of said bushings, forwardly projecting check arms on the rear elements, said arms projecting forwardly of the point of attachment of the front elements to said tractor, and check chains extending from said tractor to said arms at the forward ends thereof to limit relative lateral movement of said elements, said threaded bearing members being removable even through said arms are restrained from movement by said check chains to accommodate subsequent lateral arm movement.

4. In a power liftable implement hitch for a tractor having a vertically movable rock arm, a forward hitch link element adapted for attachment to a tractor for movement in a vertical plane and having a freely projecting rear end defined by vertically spaced plates, connecting means for joining said forward elements to said rock arm for vertical movement therewith, a rear element having its forward end interposed between said plates and its rear end projecting therefrom for attachment to a power-liftable implement, and interengaging bearing means on said elements supporting said rear element for relative movement in a horizontal plane, said bearing means normally retaining said rear element in vertically spaced relation to the lower of said plates, and said rear element being deflectable under loads in excess of a predetermined load to contact said lower plate for support thereby during power lifting of said front element.

5. In a lift-type implement hitch for a tractor having a power-liftable rock arm, a pair of interdigitated longitudinally aligned hitch link elements, connecting means joining one of said elements to said rock arm for movement therewith, vertically disposed bearing means cooperably carried by said elements to provide a vertical pivot axis about which said elements are relatively movable, and means on said one of said elements underlying the other of said elements to receive said other element thereagainst when the same is deflected from its normal configuration by an excessive load imposed thereon during power lifting of said one of said elements.

6. In an implement hitch for a tractor, a forward hitch element having its forward end attachable to the tractor and a bifurcated rear end projecting rearwardly therefrom and having laterally spaced vertically aligned apertures in the bifurcations thereof, a rear hitch element having its forward end inserted between the bifurcations of said forward element and its rear end attachable to an implement, a pair of laterally spaced open-ended bushings carried by said forward end of said rear element and defining interior bearing surfaces, and bearing projections extending through the apertures of the bifucations of said forward elements into bearing contact with said bushing surfaces of a selected one of said bushings aligned with a pair of said apertures, whereby said elements are disposed for relative movement about an anti-friction bearing defining a pivot axis determined by the bushing into which said projections are inserted.

7. In an implement hitch for a tractor, a forward hitch element having its forward end attachable to the tractor and a bifurcated rear end projecting rearwardly therefrom, a rear hitch element having its forward end inserted between the bifurcations of said forward element and its rear end attachable to an implement, an open-ended bushing carried by said forward end of said rear element and defining interior bearing surfaces, and bearing projections carried by the bifurcations of said forward element and extending into bearing contact with said bushing surfaces, the bifurcations of said forward element being vertically aligned and said bushing and projections defining a vertical pivot axis, with said rear element being deflectable under greater than predetermined loads into contact with the lower of said bifurcations rearwardly of said pivot axis for support upon said lower bifurcation.

8. In an implement hitch for a tractor, a forward hitch element having its forward end attachable to the tractor and a bifurcated rear hitch element having its forward end provided with an integrally formed laterally projecting crank arm interposed between the bifurcations of said forward element and its rear end attachable to an implement, open-ended laterally spaced bearing bushings carried by said crank arm and each having bearing seats at the open ends thereof, the bifurcations of said forward element each having spaced apertures registerable with each of said bushings, and a pair of bearing nuts selectively insertable into said apertures for mating anti-friction contact with the bushing bearing seats, said nuts when inserted into opposing ends of the same bushing cooperably defining a pivot axis about which said elements are pivotal, and said nuts when inserted into different bushings rigidifying said elements against pivoting movement.

RAYMOND J. MILLER.
RAYMOND W. WILSON.

References Cited in the file of this patent

UNITED STATES PATENTS

| Number | Name | Date |
| --- | --- | --- |
| 1,132,745 | Sundh | Mar. 23, 1915 |
| 1,379,399 | Ferguson | May 24, 1921 |
| 1,904,138 | Hasson et al. | Apr. 18, 1933 |
| 2,398,365 | Ellis | Apr. 16, 1946 |